(12) United States Patent
Boettcher et al.

(10) Patent No.: US 10,130,920 B2
(45) Date of Patent: Nov. 20, 2018

(54) MIXING IMPELLER, METHOD OF MANUFACTURING A FIRST SUBASSEMBLY OF THE MIXING IMPELLER AND METHOD OF ASSEMBLING THE MIXING IMPELLER

(71) Applicant: Sartorius Stedim Biotech GmbH, Goettingen (DE)

(72) Inventors: Lars Boettcher, Melsungen (DE); Jonathan E. Cutting, East Setauket, NY (US); Sharon D. West, Sunnyside, NY (US); Martin Oschwald, Tagelswangen (CH); Mike Bates, Stonehouse (GB)

(73) Assignee: Sartorius Stedim Biotech GmbH (DE)

( * ) Notice: Subject to any disclaimer, the term of this patent is extended or adjusted under 35 U.S.C. 154(b) by 302 days.

(21) Appl. No.: 15/010,104

(22) Filed: Jan. 29, 2016

(65) Prior Publication Data
US 2017/0216789 A1    Aug. 3, 2017

(51) Int. Cl.
| | | |
|---|---|---|
| *B01F 13/08* | (2006.01) | |
| *B01F 7/00* | (2006.01) | |
| *B29C 45/14* | (2006.01) | |
| *B01F 15/00* | (2006.01) | |
| *B29D 99/00* | (2010.01) | |

(52) U.S. Cl.
CPC ........ *B01F 7/00341* (2013.01); *B01F 7/0025* (2013.01); *B01F 13/0827* (2013.01); *B01F 15/0085* (2013.01); *B01F 15/00935* (2013.01); *B29C 45/1418* (2013.01); *B29C 45/14819* (2013.01); *B29D 99/0082* (2013.01); *B29K 2995/0008* (2013.01)

(58) Field of Classification Search
CPC .................................................... B01F 13/0827
USPC ................................................. 366/273, 274
See application file for complete search history.

(56) References Cited

U.S. PATENT DOCUMENTS

| | | | | | |
|---|---|---|---|---|---|
| 2,566,743 | A | * | 9/1951 | Okulitch | H02K 49/108 188/264 R |
| 3,570,819 | A | * | 3/1971 | Rosinger | B01F 13/0818 366/274 |
| 2001/0055240 | A1 | * | 12/2001 | Bruno | B01F 3/04539 366/274 |
| 2002/0041537 | A1 | * | 4/2002 | Yale | B01F 13/0863 366/273 |
| 2002/0196705 | A1 | * | 12/2002 | Jersey | A47J 43/0465 366/274 |
| 2007/0189115 | A1 | * | 8/2007 | Yaniv | B01F 13/0827 366/274 |
| 2010/0046323 | A1 | * | 2/2010 | Tien | B01F 13/0818 366/274 |

* cited by examiner

*Primary Examiner* — David L Sorkin
(74) *Attorney, Agent, or Firm* — Gerald E. Hespos; Michael J. Porco; Matthew T. Hespos

(57) ABSTRACT

A mixing impeller has first and second subassemblies. A magnet is accommodated in the first subassembly and is adapted to be magnetically coupled to a drive device to be driven. The second subassembly has at least one impeller blade for mixing components when rotating the mixing impeller. The first and second subassemblies are formed as separate entities which are selectively engageable. A method of manufacturing the first subassembly and a method of assembling the mixing impeller also are provided.

6 Claims, 5 Drawing Sheets

FIG. 4a
FIG. 4b
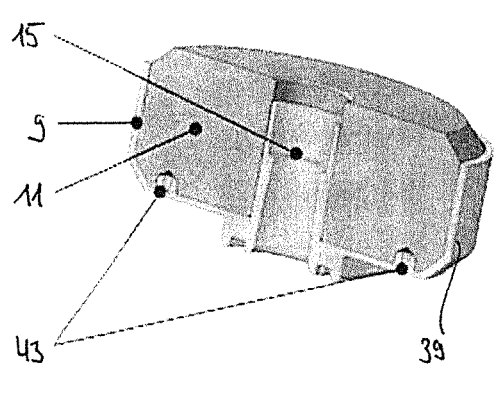
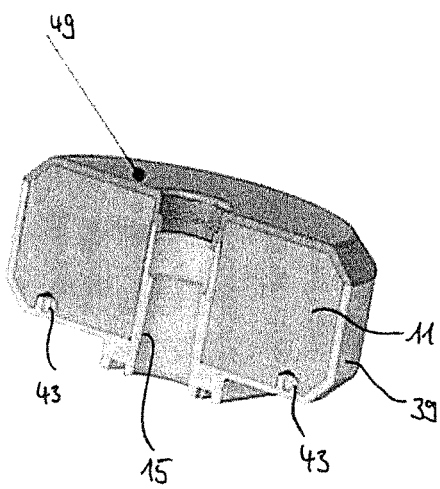

MIXING IMPELLER, METHOD OF MANUFACTURING A FIRST SUBASSEMBLY OF THE MIXING IMPELLER AND METHOD OF ASSEMBLING THE MIXING IMPELLER

BACKGROUND

1. Field of the Invention

The invention refers to a mixing impeller including two engageable subassemblies, a method of manufacturing one of the subassembly and a method of assembling the two subassemblies.

2. Related Art

In the conventional engineering practice, a mixing device comprises a mixing vessel containing fluids to be mixed and a motor driving a shaft to which one or more mixing impellers are fixed. The mixing impeller may be mounted to the shaft by a hub which is bolted or welded in place so that it does not come loose during operation. The mixing impeller is typically specified along with the mixing vessel according to design guidelines (for example, Handbook of Industrial Mixing, Paul et al.) so as to achieve the desired performance. Unless there is a process change or a need for refurbishment the mixing impeller remains fixed to the shaft.

Some applications require that the mixing equipment is fully closed with no possibility of leakage between the mixing vessel and the environment—for example, the fluids to be mixed are either hazardous (e.g. toxic) or if they are sensitive to contamination from the outside environment (e.g. highly purified pharmaceutical material). In such cases a magnet drive system may be employed as a means of transmitting torque between an external motor and a mixing impeller inside of the mixing vessel. A driving magnet at the outside of the mixing vessel is driven by the external motor, and a follower magnet is arranged inside of the mixing impeller in the mixing vessel.

In contrast to the conventional mixing equipment, in which mixing vessels are typically fabricated from stainless steel or other alloys, single-use systems comprise plastic bags as mixing vessels and are used only once. Single-use systems are increasingly used in biopharmaceutical manufacturing operations because of the increased flexibility, lower capital cost, elimination of cleaning steps, reduced risk of cross-contamination, and reduced utility burden.

From the state of the art, single-use mixing impellers are known, which comprise a plastic impeller housing unitarily formed with a plurality of mixing blades extending from the impeller housing. One or more magnet(s) are inserted into cavities in the impeller housing, which is then closed by a plastic cover glued or ultrasonically welded to the impeller housing in order to prevent any fluid contact between the magnet(s) and the fluids to be mixed. The number of magnets and the geometry of each magnet both depend on the type of magnetic drive system being used. Mixing impellers as previously described are produced by e.g. Millipore or Pall Corporation (see e.g. LevMixer).

A range of mixing impeller geometries could be needed to meet performance requirements for a wide range of applications. For example, different diameters could be wanted to keep a constant D/T ratio (ratio of impeller diameter to mixing vessel diameter) so that the performance is consistent across different process scales. As another example, homogenization of shear-sensitive materials might require a low shear mixing impeller geometry, while a powder dissolution might require a high shear mixing impeller geometry.

Given the wide range of applications found in biopharmaceutical manufacturing, it is not likely that a single mixing impeller can meet all requirements. Two disadvantages become apparent as more mixing impellers are required. First, tooling must be created for each style of mixing impellers. This includes the molds as well as any assembly tooling. Second, an inventory of each mixing impeller variant must be held in order to ensure that the correct parts are on hand at the manufacturing facility where final assembly of the single-use mixing vessel is done.

Therefore, it is the underlying technical problem of the present invention to provide a mixing impeller which enables a wide range of applications in a cost-saving manner.

SUMMARY

According to an aspect of this disclosure, the underlying technical problem has been solved by a mixing impeller comprising:
 a first subassembly in which at least one magnet is accommodated, wherein the magnet is adapted to be magnetically coupled to a drive device to be driven; and
 a second subassembly comprising at least one impeller blade for mixing components when rotating the mixing impeller;
 wherein the first and second subassemblies are formed as separate entities that are selectively engageable.

The mixing impeller may be used to mix components in a mixing vessel, which accommodates the components to be mixed. The mixing impeller comprises two separately manufactured subassemblies, which form the mixing impeller when being engaged. The first subassembly may correspond to the basis of the mixing impeller in which the at least one magnet is arranged. Preferably, the at least one magnet is encapsulated in the first subassembly, so that any contact between the at least one magnet and the components to be mixed can be prevented. The first subassembly may be formed as a circular element. The second subassembly preferably includes a central basis and at least one mixing blade being attached to the central basis. When rotating the mixing impeller the mixing blade(s) mix(es) the components.

Depending on the mixing application, the user can chose a second subassembly from a set of second subassemblies. The second subassemblies thereby may differ in the size, shape and/or arrangement of the mixing blade(s). For example, the mixing blade may extend either radially or axially with respect to a rotation axis of the mixing impeller. Further, the mixing blade may be vertically or diagonally with respect to the rotation axis of the mixing impeller. Furthermore, the mixing blade may be back-swept (backward leaning with respect to a rotation direction) and/or curved. The shape and size may be chosen according to the components to be mixed (whether the components are solid, gaseous and/or liquid). Further, the shape and size may be chosen according to the size and shape of the mixing vessel in which the mixing impeller is arranged.

The second subassembly may be made of plastic so that the second subassembly can be manufactured cheaply.

If the mixing vessel is reusable, the first subassembly may be considered as a permanent element in a mixing vessel and the second subassembly may be chosen and changed, if required, depending on the mixing application. In other words, the magnet can be re-used, which is the most expensive part of the mixing impeller. By means of changing the second subassemblies in the sense of changing the attachment, a large variety of mixing applications can be provided. The inventory of each mixing impeller variant can be prevented.

In particular, the mixing impeller according to the present invention may carry out mixing applications like e.g. homogenizing (compensation of concentration differences of different miscible components), liquid/liquid dispersing (stirring in of an insoluble medium into another fluid), liquid/gaseous dispersing (stirring in of gaseous phase into a liquid phase), suspending (swirling up and mixing of solids in a liquid phase), and emulsifying (stirring in of a liquid phase into a second liquid). It is just decisive that a suitable second subassembly is chosen for the relevant mixing application.

The first and second subassemblies may be engageable by means of a snap-fit mechanism.

A snap-fit mechanism enables an engagement process between the first and second subassemblies simply by hand. This could be done e.g. by a person who assembles e.g. a single-use mixing vessel. Furthermore, the snap-fit mechanism may also allow an easy removal of the second subassemblies from the first subassembly and the connection with another second subassembly. In other words, a snap-fit connection provides a releasable connection between the first and second subassemblies. This could be done e.g. by the user who has extending skills regarding this matter when using a reusable mixing vessel.

In one embodiment, the first subassembly comprises at least one recess, which extends substantially along a rotation axis of the mixing impeller, wherein the recess has at least one protrusion.

The protrusion may extend around the rotation axis of the mixing impeller. If one protrusion is formed, the protrusion may fully surround the rotation axis or in part. If more than one protrusion is provided, the protrusions may surround the rotation axis in sections. Alternatively, the protrusions may be spaced along the rotation axis. In particular, the protrusion may correspond to a step in the recess.

The recess may be a depression that extends into the first subassembly substantially along the rotation axis. Preferably, the recess may be formed as a through hole, so that the recess extends from an upper side of the first subassembly, which faces the second subassembly in the mounted state, to a lower side of the first subassembly, which is opposite to the upper side.

The "mounted state" means that state when the first and second subassemblies are engaged.

In one embodiment, the second subassembly comprises at least one engagement member extending from a lower surface of the second subassembly, which faces the first subassembly in a mounted state, wherein the engagement member has an enlarged end portion at its free end that is engageable with the protrusion in a respective recess in the first subassembly when inserting the engagement member of the second subassembly into the recess of the first subassembly.

The size and shape of the engagement member is configured such that the engagement member is insertable into the recess of the first subassembly. In particular, the length of the engagement member is configured such that the enlarged end portion of the engagement member is able to engage the at least one protrusion. The diameter of the enlarged end portion may be larger than the narrowed area where the at least one protrusion is provided so that the enlarged end portion has to be compressed when penetrating the area at the protrusion. As soon as the enlarged end portion of the engagement member has passed the narrowed portion, the enlarged end portion expands again. Preferably, the enlarged end portion is formed as a ball or as a mushroom head. The engagement member may be shaped as a bar, which preferably tapers towards the enlarged end portion.

If the recess is formed as a through-hole as described above, the engagement between the first and second assemblies may be released by means of e.g. a stick that is inserted into the through hole from the lower side of the first subassembly and pressed against the enlarged end portion.

The above described configuration of the first and second subassemblies allows an easy engagement/connection between the first and second subassemblies which can be carried out manually by the user. Any assembling tools can be prevented.

The recess of the first subassembly may be arranged at a center of the first subassembly.

Further, the magnet may be substantially ring-shaped and may substantially surround the recess of the first subassembly.

According to another aspect this disclosure, the underlying technical problem has been solved by a method of manufacturing a first subassembly of a mixing impeller being connectable to a second subassembly comprising at least one impeller blade, the method including:
  molding a first encapsulation part having at least one accommodation space, wherein the at least one accommodation space has an open side;
  at least partly inserting at least one magnet into the at least one accommodation space; and
  molding a second encapsulation part and closing the open side of the at least one accommodation space of the first encapsulation part.

Any information with respect to the first and second subassemblies given regarding the previous aspect also applies for the present method of manufacturing.

The first subassembly comprises a first encapsulation part, at least one magnet and a second encapsulation part. The first encapsulation part is molded in that a mold is provided in which at least one accommodation space/hollow space is formed. The number of accommodation spaces depends on the number of magnets to be inserted into the first encapsulation part. Furthermore, the shape and/or size of a accommodation space may correspond to the shape and/or size of the magnet to be inserted so that the magnet perfectly fits into the accommodation space. Thus, any shifting of the magnet within the first encapsulation part can be prevented when rotating the mixing impeller.

The accommodation space has an open side. This side could be arranged at the upper or lower side of the first encapsulation part. The opening of the accommodation space may have the size of the accommodation space being located below the opening in the first encapsulation part. At least the opening should be that large so that the respective magnet can be inserted into the accommodation space. Alternatively, the complete lower or upper side of the first encapsulation part is open.

The number, the size, shape and the position of the magnets in the first encapsulation part is defined by the drive device (e.g. motor) that drives the mixing impeller so that the mixing impeller rotates.

The open side of the at least one accommodation space is closed by a molded second encapsulation part. If more than one accommodation space is present in the first encapsulation part, each of this accommodation space may be closed by a separate second encapsulation part. Alternatively, a second encapsulation part may be that large so that more than one, preferably all, accommodation spaces are closed. The first encapsulation part and the second encapsulation part may be secured to each other by gluing or ultrasonic welding so that the at least one magnet is fully encapsulated and any contact to the components to be mixed can be prevented.

In one embodiment, the first and second encapsulation parts are formed by injection molding.

Injection molding is a well-understood process that is readily automated and typically operates a low cycle time, so that the method of encapsulating the at least one magnet of the first subassembly of the mixing impeller can be manufactured in a reliable and cost-saving manner.

The step of molding the second encapsulation part may comprise inserting the first encapsulation part with the inserted magnet into an injection molding device and forming the second encapsulation part in the injection molding device.

In particular, the first encapsulation part with the at least one magnet inserted in the first encapsulation part may be arranged in a mold of preferably an injection molding machine. In that mold, the second encapsulation part is molded such that the at least one accommodation space is closed and the second encapsulation part is securely connected with the first encapsulation part. Any steps of gluing or ultrasonic welding can be prevented so that the cycle time and the costs for producing the mixing impeller can be further reduced.

The first encapsulation part may comprise at least one recess that extends at least partly along a rotation axis of the mixing impeller.

According to a further aspect the disclosure, the underlying technical problem has been solved by a method of assembling a mixing impeller, comprising:
  providing a first subassembly in which at least one magnet is encapsulated,
  wherein the magnet is adapted to be magnetically coupled to a drive device to be driven;
  providing a second subassembly comprising at least one impeller blade for mixing components; and
  engaging the first subassembly with the second subassembly.

The step of engaging may comprise inserting at least one engagement member, which extends from a lower surface of the second subassembly, into a respective recess in the first subassembly, which extends at least partly along a rotation axis of the mixing impeller. Thus, an enlarged end portion at a free end of the engagement member engages with a protrusion in a respective recess in the first subassembly.

The step of engaging the first subassembly with the second subassembly may comprise selecting one specific second subassembly from a set of second subassemblies, wherein second subassemblies in the set of subassemblies differ regarding at least one of their geometry and size.

These and other objects, features and advantages of the present invention will become more evident by studying the following detailed description of preferred embodiments and the accompanying drawings. Further, it is pointed out that, although embodiments are described separately, single features of these embodiments can be combined for additional embodiments.

BRIEF DESCRIPTION OF THE DRAWINGS

FIG. 4a is a cross-section view of the first encapsulation part when the magnet is inserted.

FIG. 4b is a cross-sectional view showing the magnet fully encapsulated by the first and second encapsulation parts.

DETAILED DESCRIPTION

Figure 1A:
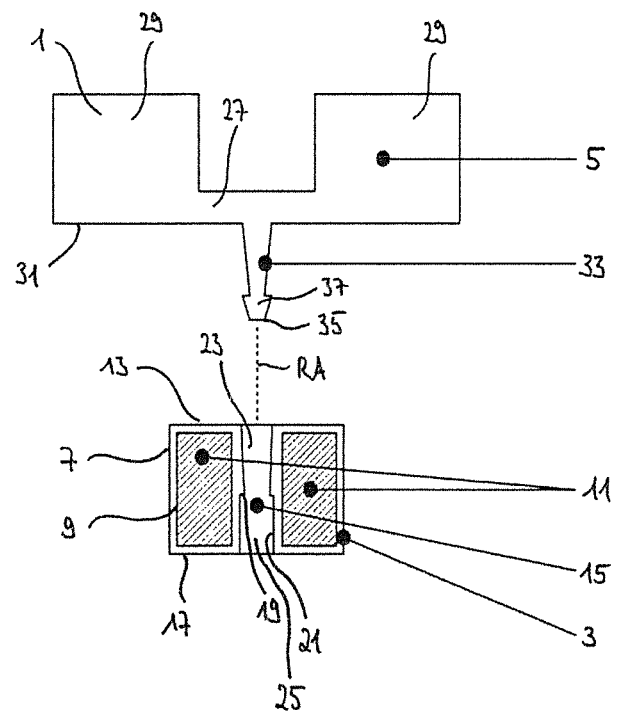
FIG. 1a is a cross-sectional view of the first and second subassemblies before being engaged.
Figure 1B:
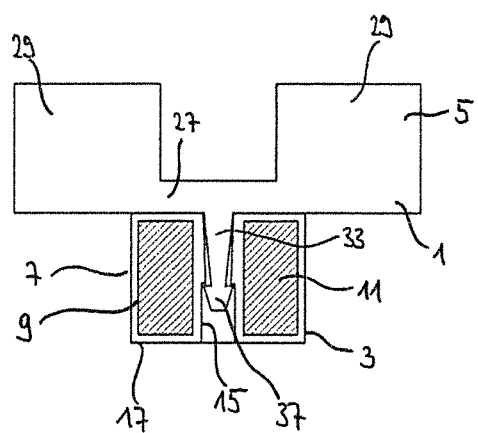
FIG. 1b is a cross-sectional view of the first and second subassemblies in the engaged state.

FIG. 1 shows a cross sectional view of a mixing impeller 1 for mixing components in a mixing vessel. The mixing impeller 1 comprises a first subassembly 3 and a second subassembly 5 that are separately formed, but that are connectable by means of an engagement mechanism. FIG. 1a) shows a state before the first subassembly 3 and the second subassembly 5 are connected. FIG. 1b), however, shows a mounted state of the mixing impeller 1, in which the first and second subassemblies 3, 5 are connected/engaged.

The first subassembly 3 comprises a housing 7 that preferably has a circular shape and/or is made of plastic. At least one accommodation space 9 is provided inside of said housing 7 for accommodating a magnet 11. If more than one accommodation space 9 is formed in the first subassembly 3, preferably each of the accommodation spaces 9 is filled with a magnet 11. In the case of FIG. 1, one accommodation space 9 is formed in the housing 7 and has a ring-shape. A ring-shaped magnet 11 is inserted into said accommodation space 9. The size of the accommodation space 9 preferably corresponds to the size of the magnet 11 so that the magnet 11 is not able to shift inside of the accommodation space 9 when rotating the mixing impeller 1. The number, size, shape and arrangement of the at least one magnet depends of the drive device with which the magnet 11 is magnetically coupleable to be driven. For example, the magnet 11 of FIG. 1 could work as a follower magnet. A motor outside of the mixing vessel could comprise a drive magnet. If the drive magnet driven by the motor rotates, the follower magnet 11 being magnetically coupled with the drive magnet also rotates. The drive magnet, however, might also consist of a plurality of drive magnets which are arranged in a circle. In this case, the follower magnet 11 in the first subassembly 3 would have to comprise the same number of magnets, which are arranged similarly.

Further, at least one recess is provided in an upper side 13 of the housing 7, which faces the second subassembly 5 in the mounted state. The at least one recess penetrates the housing 7 substantially along a rotation axis RA of the mixing impeller 1. In the case of FIG. 1, the recess is formed as a through hole 15 that extends from the upper side 13 towards a lower side 17 of the first subassembly 3 along the rotation axis RA. The ring-shaped magnet 11 surrounds the through hole 15.

In the following, the through hole 15 is further described. It is pointed out, however, that the following information also applies for a recess.

At least one protrusion 19 is provided in the through hole 15, and at least partly extends along the circumferential wall 21 of the through hole 15. The protrusion 19 may be formed as a bulge or, as in the case of FIG. 1, as a step. As shown in FIG. 1, the through hole 15 is separated into an upper portion 23 and a lower portion 25 separated by the protrusion 19. Preferably, the upper portion 23, which is closer to the second subassembly 5 in the mounted state, has a smaller cross-section perpendicular to the rotation axis RA, while the lower portion 25 has a wider cross-section.

The second subassembly 5 may comprise of a central basis 27 that preferably has a circular shape and/or disk-shape. At least one mixing blade 29 is attached to the central basis 27. Preferably, the second subassembly is formed of plastic and/or all elements of the second subassembly 5 are formed unitarily. The mixing blade 29 may extend radially or, as shown in FIG. 1, axially from the central basis 27. The mixing blade 29 may be arranged vertically (parallel to the rotation axis RA), as shown in FIG. 1. It is, however, also possible that the at least one mixing blade 29 is arranged diagonally with respect to the rotation axis RA. In particular, the mixing blade 29 may have a variety of shapes, sizes and/or arrangement. Some of them have already been described above. In particular, the configuration of the second subassembly 5 is chosen selectively according to the mixing application, i.e. with respect to the components to be mixed. This can be done e.g. by a person who assembles e.g. a single-use mixing vessel or by the user which has extending skills regarding this matter when using a reusable mixing vessel.

At least one engagement member 33 is arranged at a lower side 31 of the second subassembly 5, which faces the first subassembly 3 in the mounted state. In the case of FIG. 1, the engagement member 33 is formed as a rod. An enlarged end portion 37 is provided at its free end and preferably has the shape of a mushroom head. Furthermore, the engagement member 33 may taper toward the free end 35 as shown in FIG. 1.

The at least one engagement member 33 is insertable into the through hole 15 of the first subassembly 3 to connect the first and second subassemblies 3 and 5. Preferably, the through hole 15 has a size and shape such that at least partly a force fit and/or tight fit appears between the first and second subassemblies. Thereby, the first and second subassemblies 3 and 5 are connected/engaged such that a reliable connection is provided.

As shown in FIG. 1b), the engagement member 33 is inserted into the through hole 15 such that the enlarged end portion 37 of the engagement member 33 engages the protrusion 19. Preferably, the enlarged end portion 37 tapers toward its free end so that the enlarged end portion 37 is able to easily pass the narrow upper portion 23 of the through hole 15 when being inserted. In particular, the enlarged end portion 37 of the engagement member 33 may be compressible so that the enlarged end portion 37 is able to pass the upper portion 23 of the through hole 15. As soon as the enlarged end portion 37 has passed the upper portion 23, the enlarged end portion 37 may expand again.

Figure 2:
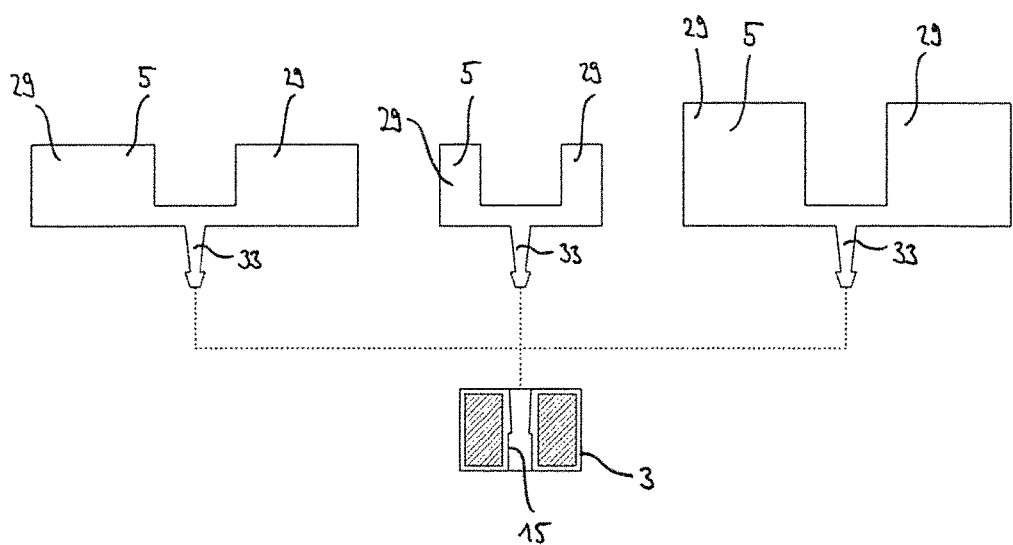
FIG. 2 is a cross-sectional view of a first subassembly of a mixing impeller and a variety of second subassemblies that could be connected/engaged with the first subassembly.

Thus, a snap-fit mechanism is provided that allows an easy connection between the first and second subassemblies 3 and 5, which can be done manually by the user or a person when assembling the mixing vessel. Moreover, this connection may be releasable (if the mixing vessel is reusable) so that the second subassembly 5 can be removed and exchanged by another second subassembly 5. In other words, the user can selectively chose the second subassembly 5 having the perfect geometry (especially with respect to the mixing blades) for the relevant mixing application to be carried out by the mixing impeller 1. The first subassembly 3, which contains the expensive magnet 11, however, remains in the mixing vessel. In this respect, FIG. 2 shows a cross-sectional view of a first subassembly 3 and a variety of second subassembly 5 that differ regarding their size and shape. The user just has to select which one of the second subassemblies 5 is the best for the relevant mixing application and/or the used mixing vessel.

In the following a manufacturing method of the first subassembly 3 is described.

Figure 3A:
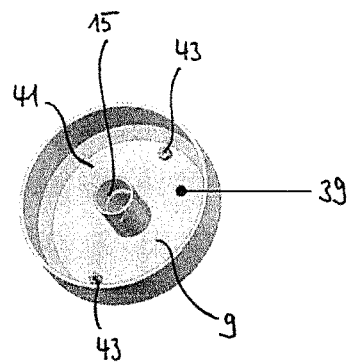
FIG. 3a is a top view of the first encapsulation part of the first subassembly.

FIG. 3a) shows a top view of a first encapsulation part 39 of the first subassembly 3. The first encapsulation part 39 may have a bowl-shape that corresponds to the shape and size of the first subassembly 3. The above described at least one accommodation space 9 is provided inside of the first encapsulation part 39. Further, the through-hole 15, as described above, is formed in the first encapsulation part 39. Preferably, the first encapsulation part 39 is formed by injection molding.

A bottom plate 41 of the first encapsulation part 39 may correspond to the upper side 13 (see FIG. 3b)) or lower side 17 of the first subassembly 3.

Figure 3B:
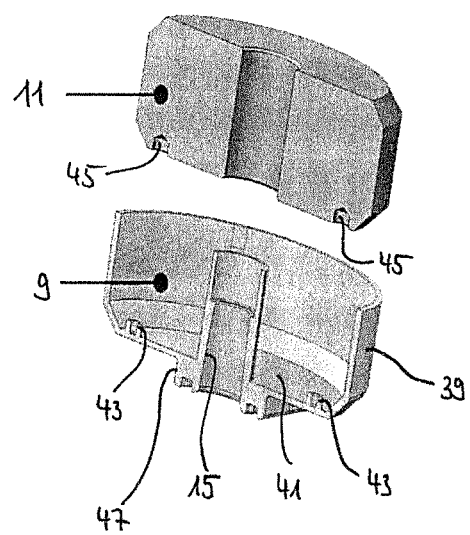
FIG. 3b is a cross-sectional view of the first encapsulation part and the magnet before the magnet is inserted into the first encapsulation part.

At least one mounting member 43 may project from the bottom plate 41 into the at least one accommodation space 9, as shown in FIG. 3a). The mounting member 43 is adapted to engage with a respective receiving recess 45 in the respective magnet 11 to be inserted into the accommodation space 9, as shown in FIG. 3b). In particular, the mounting member 43 may be formed as a split post having a step at its free end. The receiving recess 45 in the magnet 11 has a corresponding shape and size so that the mounting member 43 is insertable into the receiving recess 45 by means of a snap-fit. When inserting the mounting member 43 into the receiving recess 45, the spit post may be compressed and afterwards expanded when having passed the step. Thus, the magnet 11 and the first encapsulation part 39 are engaged fully when being inserted into the first encapsulation part 39. The magnet 11 can no longer shift or fall out of the first encapsulation part 39 without any tool.

As shown in FIG. 3b), the first encapsulation part 39 may further have a second subassembly mounting member 47 at an outer side of the bottom plate 41. The second subassembly mounting member 47 may extend around the through hole 15 in a ring-shape. Provided that the bottom plate 41 corresponds to the upper side 13 of the first subassembly 3, the second subassembly mounting member 47 is adapted to surround a portion of the engagement member 33 that extends beyond the through hole 15, as shown in FIG. 5, in order to hold the second subassembly 5 reliably in place.

FIG. 4a) shows the state when the magnet 11 is inserted into the first encapsulation part 39.

FIG. 4b) shows the state when the open side of accommodation space 9 of the first encapsulation part 39 is closed by a second encapsulation part 49. The second encapsulation part 39 also preferably is made of plastic and/or formed by injection molding. Preferably, the first encapsulation part 39 is inserted together with the magnet 11 into an injection molding machine, in which the second encapsulation part 49 is molded. In this case, the second encapsulation part 49 is attached fixedly to the first encapsulation part 39 and the magnet 11 is encapsulated fully in the first subassembly 3. Any contact of the magnet 11 to the components to be mixed can be thereby prevented.

Figure 5:
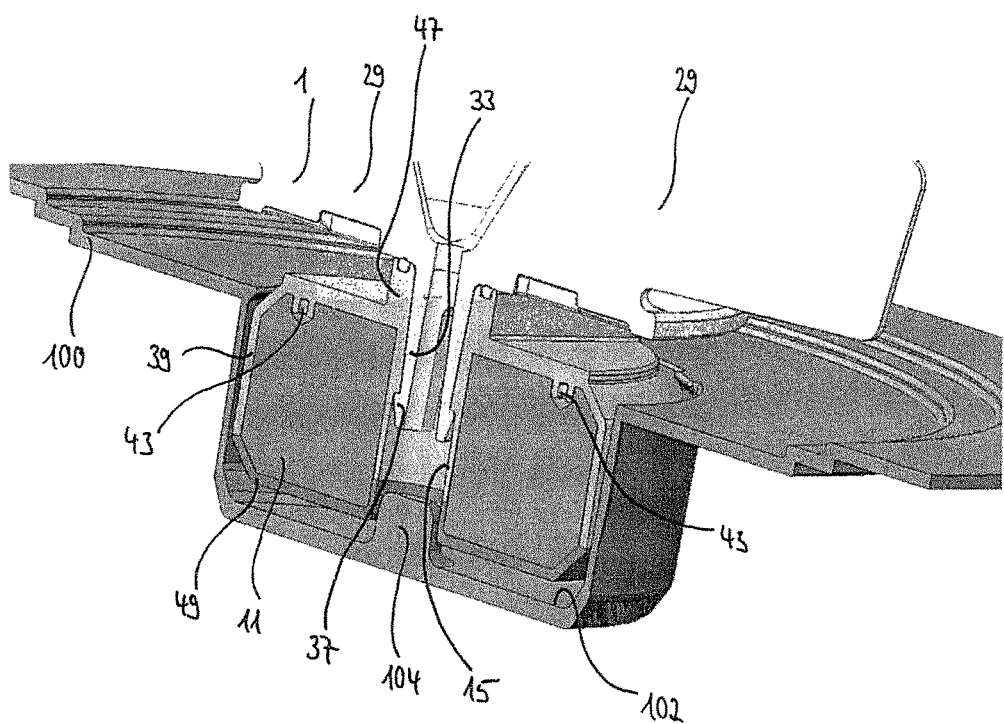
FIG. 5 is a perspective view of the mixing impeller inserted in a mixing vessel.

FIG. 5 shows a state in which the mixing impeller 1 in its mounted state is inserted into a mixing vessel 100, which is partly shown. In particular, the first subassembly 3 may be inserted into a mounting recess 102 of the mixing vessel 100, which is preferably a bottom surface of the mounting vessel 100. Provided that the mixing vessel 100 is made as a single-use mixing vessel 100 that is formed as a flexible bag, the portion of the mixing vessel 100, in which the mounting recess 102 is located, may formed as a rigid portion.

A mounting projection 104 may be provided in the mounting recess 102 and may be configured such that it is insertable into the through hole 15 of the first subassembly 3 in order to mount the mixing impeller 1 reliably in the mixing vessel.

Further, as it can be seen in FIG. 5, the engagement member 33 also may be formed as a split pin so that the engagement member 33 can be compressed easily when being inserted into the through hole 15.

What is claimed is:

1. A mixing impeller assembly comprising:
   a first subassembly having a housing with at least one accommodation space and at least one magnet accommodated in the at least one accommodation space, wherein the magnet is adapted to be magnetically coupled to a drive device to be driven, the first subassembly further having at least one recess that extends substantially along a rotation axis of the mixing impeller, the recess having at least one protrusion; and
   at least one second subassembly comprising at least one impeller blade for mixing components when rotating the mixing impeller;
   wherein the first and second subassemblies are formed as separate entities that are selectively engageable.

2. The mixing impeller assembly of claim 1, wherein the first and second subassemblies are engageable by a snap-fit mechanism.

3. The mixing impeller assembly of claim 1, wherein the second subassembly comprises at least one engagement member extending from a lower surface of the second subassembly, the engagement member facing the first subassembly in a mounted state, the engagement member having a free end and an enlarged end portion at the free end, the enlarged end portion being engageable with the protrusion in a respective recess in the first subassembly when inserting the engagement member of the second subassembly into the recess of the first subassembly.

4. The mixing impeller assembly of claim 1, wherein the recess of the first subassembly is arranged at a center of the first subassembly.

5. The mixing impeller assembly of claim 4, wherein the magnet is substantially ring-shaped and substantially surrounds the recess of the first subassembly.

6. The mixing impeller assembly of claim 1, wherein the at least one second subassembly comprises a plurality of second subassemblies, each of which is selectively engageable with the first subassembly, each of the second subassemblies in the plurality of second subassemblies including at least one second subassembly with at least one large impeller blade and at least one second subassembly with at least one small impeller blade that is smaller than the large impeller blade, wherein the second subassembly that is selected for engagement with the first subassembly is based on the sizes of the respective impeller blades and in view of a material that is to be mixed.

* * * * *